(12) United States Patent
Xia et al.

(10) Patent No.: US 9,197,533 B1
(45) Date of Patent: Nov. 24, 2015

(54) TECHNIQUE FOR MAINTAINING AND ENFORCING RELATIVE POLICIES WITH THRESHOLDS

(75) Inventors: Lei Xia, Pleasanton, CA (US); Dana Blair, Alpharetta, GA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 2238 days.

(21) Appl. No.: 11/239,613

(22) Filed: Sep. 29, 2005

Related U.S. Application Data

(60) Provisional application No. 60/679,184, filed on May 9, 2005.

(51) Int. Cl.
| | |
|---|---|
| *G06F 15/173* | (2006.01) |
| *G06F 15/16* | (2006.01) |
| *H04L 12/16* | (2006.01) |
| *H04L 12/66* | (2006.01) |
| *H04L 12/701* | (2013.01) |
| *H04L 12/24* | (2006.01) |
| *G01V 1/28* | (2006.01) |
| *H04L 29/06* | (2006.01) |

(52) U.S. Cl.
CPC *H04L 45/00* (2013.01); *G01V 1/28* (2013.01); *H04L 29/06027* (2013.01); *H04L 41/0213* (2013.01)

(58) Field of Classification Search
USPC ........... 709/239, 201, 232, 227, 235, 223; 370/235, 352, 328, 396; 718/104; 713/201; 705/37; 703/2; 702/18
See application file for complete search history.

(56) References Cited

U.S. PATENT DOCUMENTS

| | | | |
|---|---|---|---|
| 4,516,206 A * | 5/1985 | McEvilly | 702/18 |
| 6,085,241 A * | 7/2000 | Otis | 709/223 |
| 6,286,052 B1 | 9/2001 | McCloghrie et al. | |
| 6,301,613 B1 | 10/2001 | Ahlstrom et al. | |
| 6,327,618 B1 | 12/2001 | Ahlstrom et al. | |
| 6,381,628 B1 * | 4/2002 | Hunt | 709/201 |
| 6,393,473 B1 | 5/2002 | Chu | |
| 6,418,468 B1 | 7/2002 | Ahlstrom et al. | |
| 6,463,470 B1 | 10/2002 | Mohaban et al. | |
| 6,466,984 B1 | 10/2002 | Naveh et al. | |
| 6,505,244 B1 | 1/2003 | Natarajan et al. | |

(Continued)

OTHER PUBLICATIONS

U.S. Appl. No. 60/679,184, filed May 9, 2005, entitled Systems and Methods for Use With Optimized Edge Routing, by Blair et al.

(Continued)

*Primary Examiner* — Kiet Tang
(74) *Attorney, Agent, or Firm* — Novak Druce Connolly Bove + Quigg LLP

(57) ABSTRACT

A technique dynamically maintains and enforces relative policies for a prefix in a computer network. According to the novel technique, a node (e.g., an optimized edge router, OER) monitors performance characteristics for a particular prefix policy over a current path, and maintains a long-term average (LTA) value and a short-term average (STA) value of the performance characteristic. In the event the STA is worse than the LTA by a configurable amount, the prefix is considered "out-of-policy" (OOP) for that policy, and a new path may be selected accordingly. Otherwise, the prefix is considered "in-policy," and the current path is upheld. Notably, a threshold may be manually configured to account for slow performance deterioration or "spikes," such that if the performance characteristic (or STA) surpasses the threshold, the prefix is considered OOP.

29 Claims, 6 Drawing Sheets

(56) References Cited

U.S. PATENT DOCUMENTS

| | | |
|---|---|---|
| 6,584,502 B1 | 6/2003 | Natarajan et al. |
| 6,718,380 B1 | 4/2004 | Mohaban et al. |
| 6,775,280 B1 | 8/2004 | Ma et al. |
| 6,785,889 B1 * | 8/2004 | Williams ............... 718/104 |
| 6,795,860 B1 | 9/2004 | Shah |
| 6,798,743 B1 | 9/2004 | Ma et al. |
| 6,798,746 B1 | 9/2004 | Kloth et al. |
| 6,822,940 B1 | 11/2004 | Zavalkovsky et al. |
| 6,836,462 B1 | 12/2004 | Albert et al. |
| 6,868,065 B1 | 3/2005 | Kloth et al. |
| 6,870,812 B1 | 3/2005 | Kloth et al. |
| 7,046,680 B1 * | 5/2006 | McDysan et al. ............ 370/396 |
| 7,076,543 B1 * | 7/2006 | Kirti et al. .................. 709/223 |
| 2001/0036157 A1 * | 11/2001 | Blanc et al. ................. 370/235 |
| 2002/0061012 A1 * | 5/2002 | Thi et al. ..................... 370/352 |
| 2002/0099844 A1 * | 7/2002 | Baumann et al. ........... 709/232 |
| 2002/0116501 A1 * | 8/2002 | Ho et al. ...................... 709/227 |
| 2002/0120767 A1 * | 8/2002 | Oottamakorn et al. ...... 709/235 |
| 2003/0097461 A1 * | 5/2003 | Barham et al. .............. 709/235 |
| 2003/0154272 A1 * | 8/2003 | Dillon et al. ................. 709/223 |
| 2004/0044761 A1 * | 3/2004 | Phillipi et al. ............... 709/223 |
| 2004/0047345 A1 * | 3/2004 | Joseph et al. ................ 370/352 |
| 2004/0090923 A1 * | 5/2004 | Kan et al. .................... 370/252 |
| 2004/0165548 A1 * | 8/2004 | Backes ......................... 370/328 |
| 2004/0250124 A1 * | 12/2004 | Chesla et al. ................ 713/201 |
| 2005/0086363 A1 * | 4/2005 | Ji .................................. 709/235 |
| 2005/0137961 A1 * | 6/2005 | Brann et al. .................. 705/37 |
| 2005/0149299 A1 * | 7/2005 | Bolt et al. ........................ 703/2 |
| 2006/0062152 A1 * | 3/2006 | Shi et al. ...................... 370/235 |
| 2006/0146784 A1 * | 7/2006 | Karpov et al. ............... 370/351 |

OTHER PUBLICATIONS

Perlman, Radia, "Interconnections Second Edition: Bridges, Routers, Switches, and Internetworking Protocols", Sections 12.1-12.3 pp. 299-324, Addison Wesley Longman, Inc. 2000.

Rekhter, Y. et al., RFC 1771, "A Border Gateway Protocol 4 (BGP-4)", Network Working Group, Mar. 1995, pp. 1-54.

"NetFlow Services Solutions Guide", Oct. 2004, pp. 1-71, Cisco Systems, Inc.

"NetFlow V9 Export Format", 2003, pp. 1-22, Cisco Systems, Inc.

U.S. Appl. No. 10/980,550, filed Nov. 3, 2004, entitled Method and Apparatus for Automatically Optimizing Routing Operations At the Edge of a Network, by Shah et al.

United States Patent Application Serial No., filed Sep. 29, 2005, entitled Technique for Policy Conflict Resolution Using Priority With Variance, by Blair et al.

U.S. Appl. No. 11/113,629, filed Apr. 25, 2005, entitled Active Probe Path Management, by Blair et al.

U.S. Appl. No. 11/113,582, filed Apr. 25, 2005, entitled Active Probe Target Management, by Metzger et al.

* cited by examiner

| POLICY DEFINITION 305a | POLICY TYPE 310a | VALUE/THRESHOLD 315a | DIFFERENTIAL 317a |
|---|---|---|---|
| REACHABILITY | ABSOLUTE | YES | N/A |
| DELAY | ABSOLUTE | 50 ms | N/A |
| PACKET LOSS | ABSOLUTE | 5 PACKETS/min | N/A |
| COST | RELATIVE | 1000 | 100 |
| UTILIZATION | RELATIVE | 90% | 20% |
| ... | ... | ... | ... |

VOICE TRAFFIC POLICY TABLE 300a

DATA TRAFFIC POLICY TABLE 300b

| POLICY DEFINITION 305b | POLICY TYPE 310b | VALUE/THRESHOLD 315b | DIFFERENTIAL 317b |
|---|---|---|---|
| REACHABILITY | ABSOLUTE | YES | N/A |
| PACKET LOSS | ABSOLUTE | 5 PACKETS/min | N/A |
| COST | RELATIVE | 1000 | 100 |
| DELAY | RELATIVE | 90 SECONDS | 25% |
| ... | ... | ... | ... |

TECHNIQUE FOR MAINTAINING AND ENFORCING RELATIVE POLICIES WITH THRESHOLDS

RELATED APPLICATION

This application claims the benefit of U.S. Provisional Application Ser. No. 60/679,184, entitled SYSTEMS AND METHODS FOR USE WITH OPTIMIZED EDGE ROUTING, filed by Blair et al. on May 9, 2005, the contents of which are hereby incorporated in its entirety.

BACKGROUND OF THE INVENTION

1. Field of the Invention

The present invention relates to computer networks and more particularly to the use of policies in a computer network.

2. Background Information

A computer network is a geographically distributed collection of nodes interconnected by communication links and segments for transporting data between end nodes, such as personal computers and workstations ("hosts"). Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS or an area is generally referred to as a "domain," and a node that interconnects different domains together is generally referred to as a "border node or border router." In general, the autonomous system may be an enterprise network, a service provider or any other network or subnetwork. Furthermore, the autonomous system may be multi-homed, i.e., comprising a plurality of different peer (neighboring) connections to one or more other routing domains or autonomous systems.

The administrative entity of an AS typically configures network nodes within the AS to route packets using predetermined intradomain routing protocols, or interior gateway protocols (IGPs), such as conventional link-state protocols and distance-vector protocols. These IGPs define the manner with which routing information and network-topology information is exchanged and processed in the AS. Examples of link-state and distance-vectors protocols known in the art are described in Sections 12.1-12.3 of the reference book entitled *Interconnections, Second Edition*, by Radia Perlman, published January 2000, which is hereby incorporated by reference as though fully set forth herein.

Link-state protocols, such as the Open Shortest Path First (OSPF) protocol, use cost-based routing metrics to determine how data packets are routed in an AS. As understood in the art, a relative cost value may be associated with a network node to determine the relative ease/burden of communicating with that node. For instance, the cost value may be measured in terms of the average time for a data packet to reach the node, the amount of available bandwidth over a communication link coupled to the node, the monetary cost per amount of bandwidth, etc. Network nodes in the AS generate a set of cost values associated with their neighboring nodes. Each set of cost values is then "advertised" (flooded) to the other interconnected nodes. Using the advertised cost values, each node can generate a consistent "view" of the network topology, thereby enabling the nodes to determine lowest-cost routes within the AS.

Distance-vector protocols, such as the Interior Gateway Routing Protocol (IGRP) or Routing Information Protocol (RIP), use distance-based routing metrics to determine how data packets are routed in an AS. A network node may associate a distance metric with each of its interconnected nodes in the AS. For example, the distance metric may be based on, e.g., a number of hops between a pair of nodes or an actual distance separating the nodes. Operationally, the network nodes determine distances to reachable nodes in the AS and communicate these distance metrics to their neighboring nodes. Each neighboring node augments the received set of distance metrics with its own distance measurements and forwards the augmented set of metrics to its neighbors. This process is continued until each node receives a consistent view of the network topology.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

A plurality of interconnected ASes may be configured to exchange routing and reachability information among neighboring interdomain routers of the systems in accordance with a predetermined external gateway protocol, such as the Border Gateway Protocol (BGP). The BGP protocol is well known and generally described in Request for Comments (RFC) 1771, entitled *A Border Gateway Protocol 4 (BGP-4)*, published March 1995, which is hereby incorporated by reference in its entirety. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. To implement the BGP protocol, each AS includes at least one border node through which it communicates with other, interconnected ASes. Because data packets enter and exit the AS through the border node, the border node is said to be located at the "edge" of the AS.

The BGP protocol generally facilitates policy-based routing in which an administrative entity places restrictions on inter-AS routing operations. For example, the administrator of a company's AS may employ a BGP routing policy where network traffic leaving the AS is not permitted to enter a competitor's network, even if the competitor provides an otherwise acceptable routing path. BGP policies typically do not depend on the cost-based or distance-based routing metrics used with interior gateway protocols. Instead, the BGP policies rely on AS path-vector information. More specifically, the BGP protocol enables a plurality of interconnected ASes to exchange network topology information. Using this topology information, each AS can derive "paths" to the other reachable ASes, each path defining a logical sequence of ASes. For example, a path between an AS1 and an AS3 may be represented by the sequence {AS1, AS2, AS3} when only AS2 intervenes. Based on the content of these AS sequences, the BGP protocol may filter those paths that do not coincide with the administrator's policies. As such, inter-AS routing operations are performed using only the "best paths" that satisfy the BGP policies.

Because BGP policies are applied to sequences of ASes, the policies are not able to optimize inter-AS routing in other respects, such as optimizing bandwidth utilization or minimizing cost or distance metrics. Furthermore, interior gateway protocols cannot remedy these deficiencies in the BGP protocol because they do not scale well when applied to a large number of network nodes spanning multiple ASes. For instance, the process of exchanging cost-based or distance-based routing metrics among a large number of network nodes would not only consume an unreasonable amount of network bandwidth, but also would consume an unacceptable amount of processing resources for processing those metrics to generate a convergent view of the network topology.

To address the limitations of conventional routing protocols, network administrators sometimes implement additional optimizations to improve network performance. For example, a load-balancing or cost-minimizing procedure may be used in conjunction with traditional routing protocols to redistribute data flows entering or exiting a multi-homed routing domain or AS. In some networks, border nodes located at edges of ASes, e.g., between an enterprise network and one or more Internet Service Providers (ISPs), may be configured as Optimized Edge Routers (OERs). Here each OER may be configured to periodically select an Optimal Exit Link (OEL) to each ISP for a given destination prefix (a monitored prefix) based on performance, load, cost, and service level agreements (SLAs) associated with connections to the ISP. Ultimately, the end result for the enterprise network is improved Internet performance, better load distribution, and/ or lower costs for Internet connections. These additional procedures may require the border nodes (OERs) to collect various network statistics associated with the data flows. An exemplary software application that may be used to collect the network statistics at the border nodes is NetFlow™ by Cisco Systems, Incorporated, which is described in more detail in the technical paper entitled *Netflow Services Solutions Guide*, published September 2002, and is hereby incorporated by reference as though fully set forth herein.

Techniques that may be used to select the OEL for the monitored prefix include passive monitoring and/or active probing. Passive monitoring relies on gathering information from OERs learned from monitoring conventional user traffic, such as throughput, timing, latency, packet loss, reachability, etc. For example, selected interfaces at one or more network nodes monitor incoming and outgoing data flows and collect various statistics for the monitored flows. Notably, interfaces may include physical interfaces, such as a port on a network interface card, and/or logical interfaces, such as virtual private networks (VPN) implemented over multiple physical interfaces. Each node stores address prefixes and statistics for the monitored data flows, which may be periodically exported to a central management node (e.g., a "collector" or "Master"). The central management node is configured to receive prefixes and statistics from a plurality of different network nodes. A record format that may be used to export the raw prefixes and statistics is described in the technical paper entitled *Netflow v9 Export Format*, which is hereby incorporated by reference in its entirety. Further, a more sophisticated interaction (e.g., a filtered and/or pre-processed information exchange) between border nodes and a Master node is described in commonly owned copending U.S. patent application Ser. No. 10/980,550, entitled METHOD AND APPARATUS FOR AUTOMATICALLY OPTIMIZING ROUTING OPERATIONS AT THE EDGE OF A NETWORK, filed by Shah et al. on Nov. 3, 2004, the contents of which are hereby incorporated in its entirety.

Active probing, on the other hand, relies on probe packets to measure various parameters associated with accessing the monitored prefix from an originating node (source). Here, the originating node may generate multiple probe packets that are then forwarded via different exit interfaces (e.g., data links) on different paths to target nodes (targets) in the monitored (destination) prefix. Upon receiving the probe packets, the targets respond to the originating node, e.g., with return packets or other known probe responses. The originating node may eventually acquire the responses and use them to measure various parameters, such as delay, loss, jitter, and reachability, etc., associated with accessing the destination prefix via the different links.

Once the relevant statistics are obtained (e.g., at the central management node), the collected parametric (performance) information (i.e., learned from passive monitoring or active probing) is analyzed, such as either manually by a network administrator or dynamically by a software script. The analyzed information may then be used to select an OEL from among the different exits that may be used to reach the destination prefix, and/or to determine whether the data flows may be more optimally distributed. For instance, suppose an administrator desires to make more efficient use of available network bandwidth and determines that a first network interface is under-utilized and a second interface is oversubscribed. In this case, at least some data flows at the second interface may be redirected to the first interface. To effectuate such a routing change, the administrator may, for example, make static changes to the routing tables at the first and second interfaces or may re-assign local-preference values (or other priority values) associated with the data flows.

The selection of an OEL or best path (e.g., for a particular prefix) is generally based on one or more policies. As defined herein, a policy is any defined rule that determines the use of resources within the network. A policy may be based on a user, a device, a subnetwork, a network, or an application. For example, a router may be configured with a policy defined to route traffic destined for a particular prefix over a best path having the shortest hop count to the prefix. Alternatively, the policy may be defined to route traffic from a type of application over a best path based on the shortest delay or round trip time (RTT). Those skilled in the art will understand that other policies may be defined, such as, e.g., reachability, lowest packet loss, best mean opinion score (MOS), which provides a numerical measure of the quality of human speech at the destination end of the circuit (e.g., for Voice over IP, or VoIP), bandwidth, utilization, etc.

In isolation, each policy may be simply analyzed and enforced for a set of options, e.g., paths. For instance, selecting a best path to a destination prefix based on the shortest physical distance will generally result in a single path selection. In the event, however, that a plurality of policies is applied to a particular prefix, the decision to apply which policy is conventionally based on either a weighted method or on a strict priority basis. In the weighted method, a weight scheme (function) is defined (e.g., by an Enhanced Interior Gateway Routing Protocol, EIGRP) where each policy is assigned a particular weight according to a configured significance/importance. The function applies the weights to the measurements for each policy (e.g., multiplies them), and combines the values for each policy to produce a single result for a particular option (path). The highest (or lowest) total result is selected as the best option. In the strict priority method, on the other hand, each of the plurality of policies is assigned an exclusive priority, such that the policies are analyzed and enforced in order of importance. In this instance, the highest priority policy is analyzed, and a best option is selected according to the policy. In the event the policy metrics are equal for two or more options at the highest priority, the next lower policy is analyzed for those two or more equal options, and so on, until a single best option exists to select and enforce. In this manner, the policies are examined in their order of importance, resulting in selecting the best option based on the most important policy.

Notably, a third policy-based decision making technique may also be used more efficiently than the weighted or strict priority policy techniques, and is described in commonly-owned copending U.S. patent application Ser. No. 11/239,573, entitled TECHNIQUE FOR POLICY CONFLICT RESOLUTION USING PRIORITY WITH VARIANCE, filed by Blair et al. on even date herewith, the contents of which are hereby incorporated in its entirety. Briefly, according to the third technique, each prioritized policy is assigned a variance value defining a range of acceptable values for the metrics of that policy. For example, any metric that is within a variance (e.g., 10%) of the best metric for that policy is considered an acceptable value, and the next lower priority policies are analyzed until a single best option exists.

In addition to defining rules used to select a best path, however, policies may also be defined to govern performance characteristics for a particular prefix. Once a best path has been selected, it is important to verify that the path maintains acceptable performance characteristics, and that the current path is still, in fact, the best path. For instance, while a certain performance characteristic for a particular prefix conforms to the defined policy (i.e., over the current path), the prefix is considered to be "in-policy," and traffic remains on the current (best) path. These policies often take the form of an upper (or lower) threshold on a particular performance characteristic that should not be surpassed. For example, in the case of voice traffic (e.g., voice over IP, or VoIP), a policy may be defined indicating that the RTT should be less than 50 milliseconds (ms). If the measured RTT is, e.g., 40 ms, the prefix is considered to be in-policy. In the event, however, the performance characteristic for a particular prefix does not conform to the defined policy (e.g., 60 ms), the prefix is considered to be "out-of-policy" (OOP), and the node may be required to select an alternate path.

Certain types of traffic, such as voice, may have very distinct performance characteristics to be defined in order to operate at a functional quality of service. Because of this, an absolute policy may be defined according to desired quality levels (e.g., the 50 ms RTT above). Other types of traffic, such as email, are delivered on a best-effort basis, and performance characteristics are less important. Each type of traffic may have its own vague performance characteristic, and as such, it can be difficult and manually cumbersome to configure an efficient policy for each type, especially those without a distinct performance characteristic to enforce. At the same time, however, a desire still exists to select and maintain a "best" path for a prefix, regardless of how vague the policies may be for that particular prefix.

SUMMARY OF THE INVENTION

The present invention is directed to a technique for dynamically maintaining and enforcing relative policies for a prefix in a computer network. According to the novel technique, a node (e.g., an optimized edge router, OER) monitors performance characteristics for a particular prefix policy over a current path, and maintains a long-term average (LTA) value and a short-term average (STA) value of the performance characteristic. In the event the STA is worse than the LTA by a configurable amount, the prefix is considered "out-of-policy" (OOP) for that policy, and a new path may be selected accordingly. Otherwise, the prefix is considered "in-policy," and the current path is upheld. Notably, a threshold may be manually configured to account for slow performance deterioration or "spikes," such that if the performance characteristic (or STA) surpasses the threshold, the prefix is considered OOP.

In accordance with one aspect of the present invention, the node initiates the technique by monitoring the baseline LTA (e.g., 60 minutes) of performance characteristics for each relative policy over a current path to a prefix. The node also monitors the STA (e.g., 5 minutes) for the same performance characteristics. Periodically, the node corns pares the STA to the LTA to determine if the performance characteristic is decreasing in quality. If the STA has worsened by a configurable amount the prefix is considered OOP and the node may search for a more optimal path to the prefix, if any are available. Notably, the node may monitor other paths to determine whether the performance characteristics are better than those of the current in-policy path, in which case the node may optimize to the better path. The baseline LTA may be restarted each time a new path is selected, a new prefix is added, or a new policy is created.

In accordance with another aspect of the present invention, a threshold may be configured to account for various situations where a relative policy may not be the most optimally applicable. For instance, when the baseline LTA is first (re) started there is no initial value for comparison with an STA. Also, a very slow decrease in quality of the performance characteristic over time of the LTA may go undetected by the comparison to the STA, depending upon the rate of decrease and the length of each term. Spikes in the quality may also go undetected by the comparison. Once the performance characteristic or STA, depending upon configuration, surpasses the threshold (i.e., a slow decrease or spike in quality), the prefix is considered OOP, and the node may search for a more optimal path.

Advantageously, the novel technique dynamically maintains and enforces relative policies for a prefix in a computer network. By comparing the long-term and short-term average of performance characteristics, the novel technique produces an efficient relative policy for otherwise vague and non-distinct performance characteristic requirements. Also, the use of the threshold detects slow or sudden changes in the performance characteristic that may go unnoticed by comparing averages. Further, the dynamic nature of the novel technique allows for a simple operation of policy creation, alleviating the need for cumbersome manual configuration.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 3A is an exemplary voice traffic policy table that may be used in accordance with the present invention;

FIG. 3B is an exemplary data traffic policy table that may be used in accordance with the present invention;

DETAILED DESCRIPTION OF AN ILLUSTRATIVE EMBODIMENT

Figure 1:
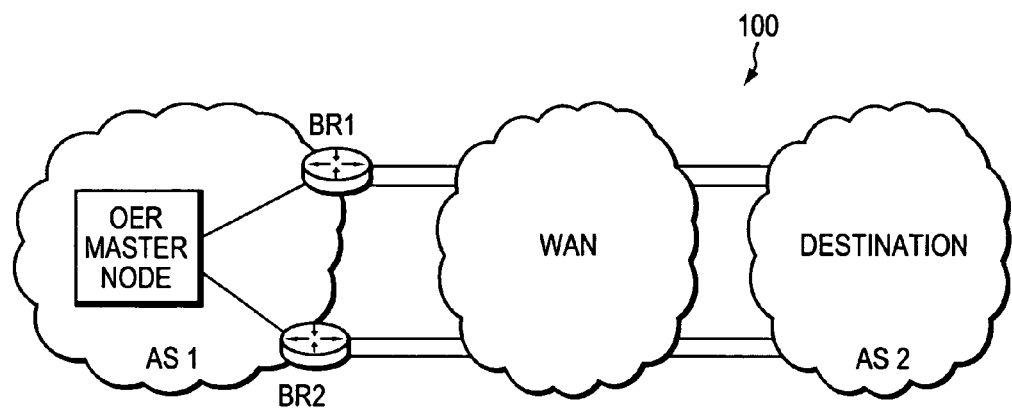
FIG. 1 is a schematic block diagram of an exemplary computer network that may be advantageously used with the present invention.

FIG. 1 is a schematic block diagram of an exemplary computer network 100 comprising a multi-homed autonomous system (AS) AS1 (e.g., an enterprise or content provider network) interconnected to AS2 (e.g., a content consumer network) via a wide area network (WAN), e.g., one or more ISPs. Although each of AS1 and AS2 is illustratively an autonomous system, those skilled in the art will appreciate that the ASes may be configured as routing domains or other networks or subnetworks. AS1 comprises one or more network nodes, including a set of communicating border nodes (illustratively, edge or border routers, BRs) BR1 and BR2, through which client communications, such as data packet traffic, can pass into and out of the AS. For example, BR1 and BR2 permit communication from AS1 to AS2 (via the WAN). Routing operations at the border nodes BR1-2 may be managed by an optimized edge routing (OER) "Master" node, which may be connected to the border nodes by, e.g., point-to-point links or a local area network. These examples are merely representative. Those skilled in the art will understand that any number of routers and nodes may be used in the computer network and connected in a variety of ways, and that the view shown herein is for simplicity.

Data packets may be communicated by the ASes (AS1 and AS2) and WAN using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing decisions within an AS may rely on predetermined "interior" gateway protocols (IGPs), such as conventional link-state or distance-vector protocols. In addition, data packets containing network topology information may be exchanged among the ASes using "external" gateway protocols, such as the Border Gateway Protocol (BGP).

Figure 2:
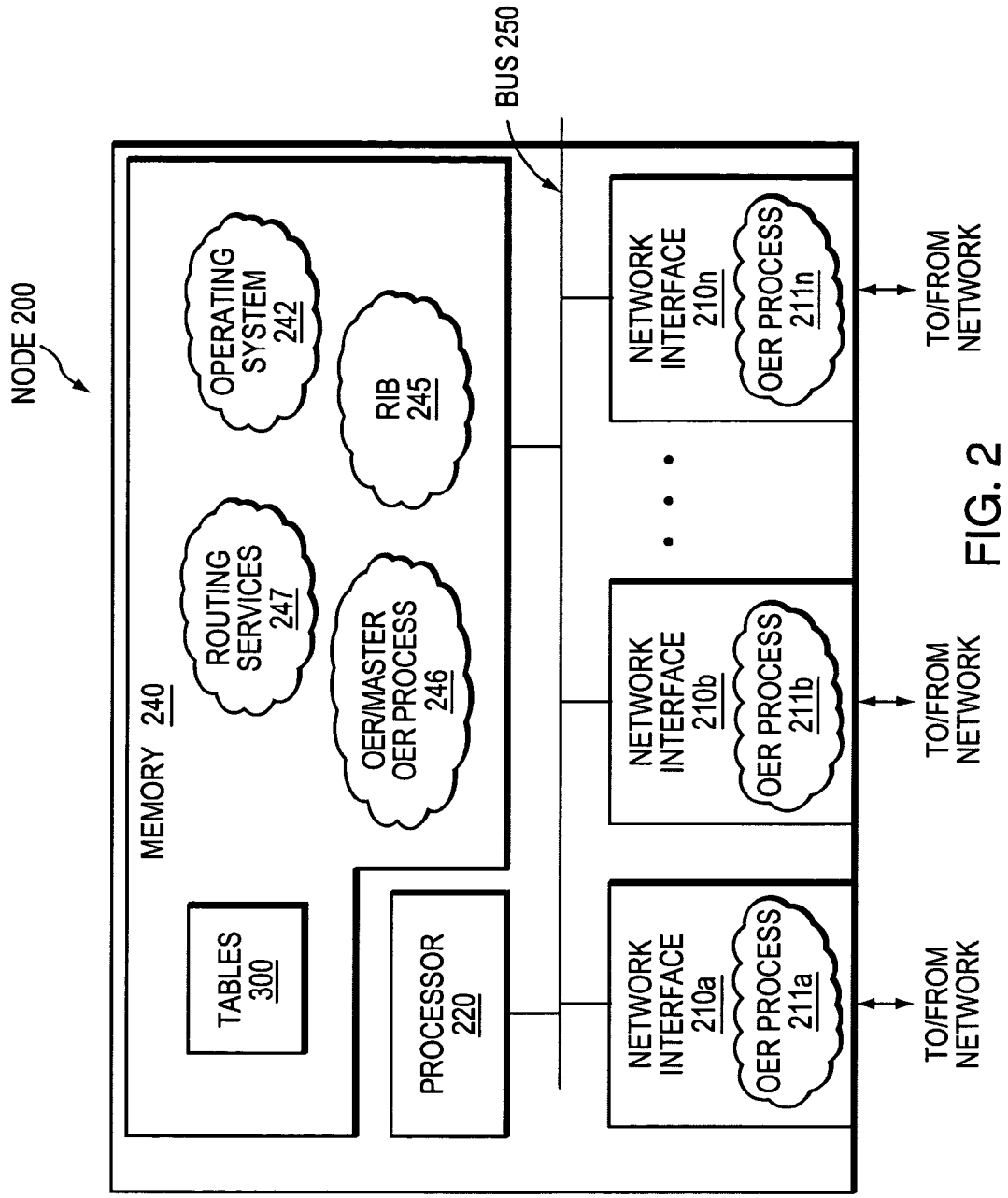
FIG. 2 is a schematic block diagram of an exemplary node that may be advantageously used with the present invention.

FIG. 2 is a schematic block diagram of an exemplary node 200 that may be advantageously used with the present invention, such as, e.g., a border node (e.g., an edge router) or a master node. The node comprises a plurality of network interfaces 210a-n (e.g., line cards), a processor 220, and a memory 240 interconnected by a system bus 250. The network interfaces 210 contain the mechanical, electrical and signaling circuitry for communicating data over physical links coupled to the network 100, and also may be adapted to process the incoming and outgoing data, such as managing active probe packets in accordance with the present invention. The network interfaces may be further configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for virtual private network (VPN) access, known to those skilled in the art. Both physical network interfaces and virtual network interfaces (e.g., routes out of an edge router) are referred to generally herein as "exits."

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as tables 300. An operating system 242 (e.g., the Internetworking Operating System, or IOS™, of Cisco Systems, Inc.), portions of which are typically resident in memory 240 and executed by the processor, functionally organizes the router by, inter alia, invoking network operations in support of software processes and/or services executing on the router. These software processes and/or services may include Routing Information Base (RIB) 245, OER/Master OER Process 246, and routing services 247. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as OSPF, IS-IS, IP, BGP, etc. These functions may be configured to manage a forwarding information database (not shown) containing, e.g., data used to make forwarding decisions. The RIB 245 maintains copies of routes (paths) provided by the routing protocols, such as IGP or BGP, in order to compute best paths/routes for installation into the routing table (not shown).

According to the illustrative embodiment of the present invention, the OER/Master OER Process 246 is employed by an OER node (e.g., border routers BR1-2) and an OER Master node (e.g., an OER Master router), respectively. The Master OER process 246 executing on the OER Master node communicates with border routers BR1-2 to request, among other things, the monitoring of a set of address prefixes. The OER processes 246 executing on the border routers monitor traffic at the edge of the AS1 and respond with, inter alia, network statistics corresponding to the monitored prefixes. Illustratively, instances of the OER process 246 execute on the network interfaces 210 as OER processes 211$a$-$n$ configured to measure various types of network statistics acquired from monitored traffic. These statistics are then forwarded from the OER processes 211$a$-$n$ to the OER process 246. The statistics may correspond to various traffic measurements, such as round-trip delay times, data throughput (i.e., the amount of data transferred or received), packet loss, reachability, etc. In general, the OER processes (notably, 246 and/or 211$a$-$n$) may measure any arbitrary traffic metric, including conventional costs based and distance-based metrics. Further, the OER Process 246 and/or 211$a$-$n$ may calculate statistical averages, variances, medians, etc. of a collection of traffic measurements.

Techniques for learning address prefixes, and collecting traffic statistics (passively monitoring) are described in commonly-owned copending U.S. patent application Ser. No. 10/980,550, entitled METHOD AND APPARATUS FOR AUTOMATICALLY OPTIMIZING ROUTING OPERATIONS AT THE EDGE OF A NETWORK, filed by Shah et al. on Nov. 3, 2004, the contents of which are hereby incorporated in its entirety. Also, techniques for actively probing (managing paths and targets of active probe packets) are described in commonly-owned copending U.S. patent application Ser. No. 11/113,629, entitled ACTIVE PROBE PATH MANAGEMENT, filed by Blair et al. on Apr. 25, 2005, and commonly owned copending U.S. patent application Ser. No. 11/113,582, entitled ACTIVE PROBE TARGET MANAGEMENT, filed by Metzger et al. on Apr. 25, 2005, the contents of both of which are hereby incorporated in their entirety.

The statistics from the OER Process 246 and/or 211$a$-$n$ are then processed at the Master node in accordance with the Master OER process 246. More specifically, the Master OER process 246 analyzes the statistics and determines whether the distribution of traffic entering and/or leaving the AS1 can be optimized, e.g., according to one or more policies, such as described herein. If so, the Master OER process may redistribute traffic routed through the border nodes by, e.g., associating new BGP local-preference values with selected traffic or statically changing the routing table contents of the border nodes. In that sense, the Master OER process selects optimal exit links (OELs) to various destination prefixes. Notably, the Master OER process 246 may be distributed among a plurality of nodes, and thus need not reside in a single OER Master node. Also, it is not necessary for a single OER Master node to contain routing processes or routing tables, other than what is necessary for communication with the border nodes. Those skilled in the art will understand that while the OER Master node and OER node (e.g., a border router) are shown as separate nodes (e.g., in FIG. 1), the Master and OER node may be configured within the same node. For example, a single border router (e.g., a home office router) having multiple exits/paths may both monitor the quality of its exits and select the OEL itself.

The present invention is directed to a technique for dynamically maintaining and enforcing relative policies for a prefix in a computer network. According to the novel technique, a node (e.g., an optimized edge router, OER) monitors performance characteristics for a particular prefix policy over a current path, and maintains a long-term average (LTA) value and a short-term average (STA) value of the performance characteristic. In the event the STA is worse than the LTA by a configurable amount, the prefix is considered "out-of-policy" (OOP) for that policy, and a new path may be selected accordingly. Otherwise, the prefix is considered "in-policy," and the current path is upheld. Notably, a threshold may be manually configured to account for slow performance deterioration or "spikes," such that if the performance characteristic (or STA) surpasses the threshold, the prefix is considered OOP.

Illustratively, one or more policies for a prefix may be configured on a node, e.g., manually or through default programming, to regulate traffic performance characteristics to the prefix, as will be understood by those skilled in the art. Notably, each type of traffic, such as, e.g., voice, data, etc., may have a separate prefix policy, since each type may require a different quality of performance characteristics. For example, an OER Master node may define a number of policies regarding the voice traffic from a source (e.g., a border node under the control of the OER Master) to a destination (e.g., a prefix within another AS, AS2). FIG. 3A is an exemplary voice traffic policy table 300$a$ that may be used in accordance with the present invention. Table 300$a$ is illustratively stored in memory 240 and includes one or more entries 320$a$, each comprising a plurality of fields for storing a policy definition 305$a$, a policy type 310$a$, a value/threshold 315$a$ to be applied to the particular policy, and an optional differential 317$a$. The table 300$a$ is illustratively maintained and managed by OER/Master OER process 246. Those skilled in the art will understand that while a table is shown and described herein, other known data structures may be used in accordance with the present invention.

Policy definitions 305$a$ may include such policies as reachability, round trip time (RTT) or delay, packet loss, cost, lowest utilization, etc. Each policy 305$a$ may be associated with a policy type 310$a$, in accordance with the present invention, such as, e.g., an absolute policy (well known in the art) or a relative policy. For instance, reachability is an absolute policy because if a path is unable to reach the destination, it should not be considered under any other policy, and as such the value 315$a$ for reachability may be represented as a "yes." Also, as mentioned herein, voice traffic may require a distinct RTT or delay of, e.g., 50 ms, so the policy type for delay may be an absolute policy with a corresponding value of 50 ms. Packet loss may also have an absolute requirement of no more than 5 packets/min. Relative policies, on the other hand, may be used for policies that do not have distinct (i.e., absolute) performance characteristics associated therewith. As an example, cost and utilization may not have distinct requirements for voice traffic, but at the same time a user may wish to generally minimize cost and utilization values. Here, the policy types 310$a$ may both be configured as relative policies (described below). Example thresholds (also described below) may be configured as 1000 and 90%, and differentials of 100 and 20%, respectively. Other policies and values may be defined, as will be understood by those skilled in the art, (e.g., range, MOS, etc.), and the table 300$a$ as shown is merely representative.

Briefly, FIG. 3B is an exemplary data traffic policy table 300$b$ that may be used in accordance with the present invention as described above with reference to FIG. 3A. Policy definitions 305$b$ for data traffic may include such policies as reachability, packet loss, cost, delay etc. Unlike voice traffic (as in table 300$a$), data traffic may not require an absolute delay value, so in data traffic table 300$b$, the policy type 310$b$ for delay may be a relative policy, and a threshold 315$b$ may be configured as 90 seconds. Notably, data traffic policy table 300$b$ may or may not include utilization as in voice traffic table 300$a$, illustrating that each traffic type may not only have different policy types and values, but different sets of policy definitions as well. Moreover, those skilled in the art will understand that different traffic types may have policies defined in a different priority order (e.g., as shown in tables 300 ordered from top to bottom).

In accordance with one aspect of the present invention, the node initiates the technique (e.g., upon "starting up") by monitoring the baseline LTA (e.g., 60 minutes) of performance characteristics for each relative policy over a current path to a prefix. The node also monitors the STA (e.g., 5 minutes) for the same performance characteristics. The long-term and short-term periods may be configured as boundaries (e.g., a new LTA value is determined at the end of 60 minutes for the past 60-minute interval), or on a rolling basis (e.g., a new LTA value is determined every minute for the past 60-minute interval). Generally, for a more reactive measurement, a rolling timer may be used. However, to limit the amount of processing, a user/administrator may wish to configure a boundary-based timer.

Periodically, e.g., on STA boundaries (5 minutes), or on a rolling STA timer basis (1 minute), the node compares the STA to the LTA to determine if the performance characteristic is decreasing in quality. If the STA has worsened by a configurable amount (e.g., 25%) the prefix is considered OOP and the node may search for a more optimal path to the prefix, if any are available, such as in accordance with OER techniques described above. Notably, the node may monitor other paths to determine whether the performance characteristics are better than those of the current in-policy path, in which case the node may optimize to the better path. The baseline LTA may be restarted each time a new path is selected, a new prefix is added, or a new policy is created.

In accordance with another aspect of the present invention, a threshold may be configured to account for various situations where a relative policy may not be the most optimally applicable. For instance, when the baseline LTA is first (re) started there is no initial value for comparison with an STA, i.e., the LTA and the STA are the same value for at least the first short-term period. Because of this, the LTA may reach and/or start at a very poor quality level that is beyond an acceptable level, and the STA may indicate no significant change to a worse value that would cause the node to search for a more optimal path. Also, a very slow decrease in quality of the performance characteristic over time of the LTA may go undetected by the comparison to the STA, depending upon the rate of decrease and the length of each term. Spikes in the quality, e.g., due to sudden congestion, or a path that occasionally fails, may also go undetected by the comparison. For example, when taking a five-minute STA, a spike that lasts for approximately one minute may not affect the overall STA substantially enough to influence an OOP event. Thresholds may be configured manually, e.g., by a user or administrator, or configured as a default value. Once the performance characteristic or STA, depending upon configuration, surpasses the threshold (i.e., a slow decrease or spike in quality), the prefix is considered OOP, and the node may search for a more optimal path. Those skilled in the art will understand that while the threshold is partly described herein to detect spikes, depending upon various configurations (e.g., threshold values, STA time periods, etc.) and values (e.g., STA, LTA, spike value, spike length, etc.), the comparison of the STA to the LTA may also be used detect the occurrence of spikes. For instance, a high threshold value may be configured to detect slow decreases in quality, to which spikes of lesser values may go undetected. As such, if the relative difference between the STA and the LTA due the spike is significant enough (i.e., a high enough value or for a long enough time period), an OOP event occurs, as described above, thereby detecting the spike.

Notably, in the event that the OOP path remains as the most optimal path, the node may be configured to continue monitoring other available paths until a more optimal (and possibly in-policy) path exists. The node may alternatively be configured to continue with the current OOP path until another relative OOP event occurs, or a threshold is reached, thereby initiating a search for a more optimal path. Those skilled in the art will also appreciate that another alternative configuration includes continuing to use the OOP path without further monitoring other paths, or without maintaining STA and LTA values. In this case, it may be beneficial to notify the user/administrator of the OOP path, e.g., though an error message.

Figure 4:
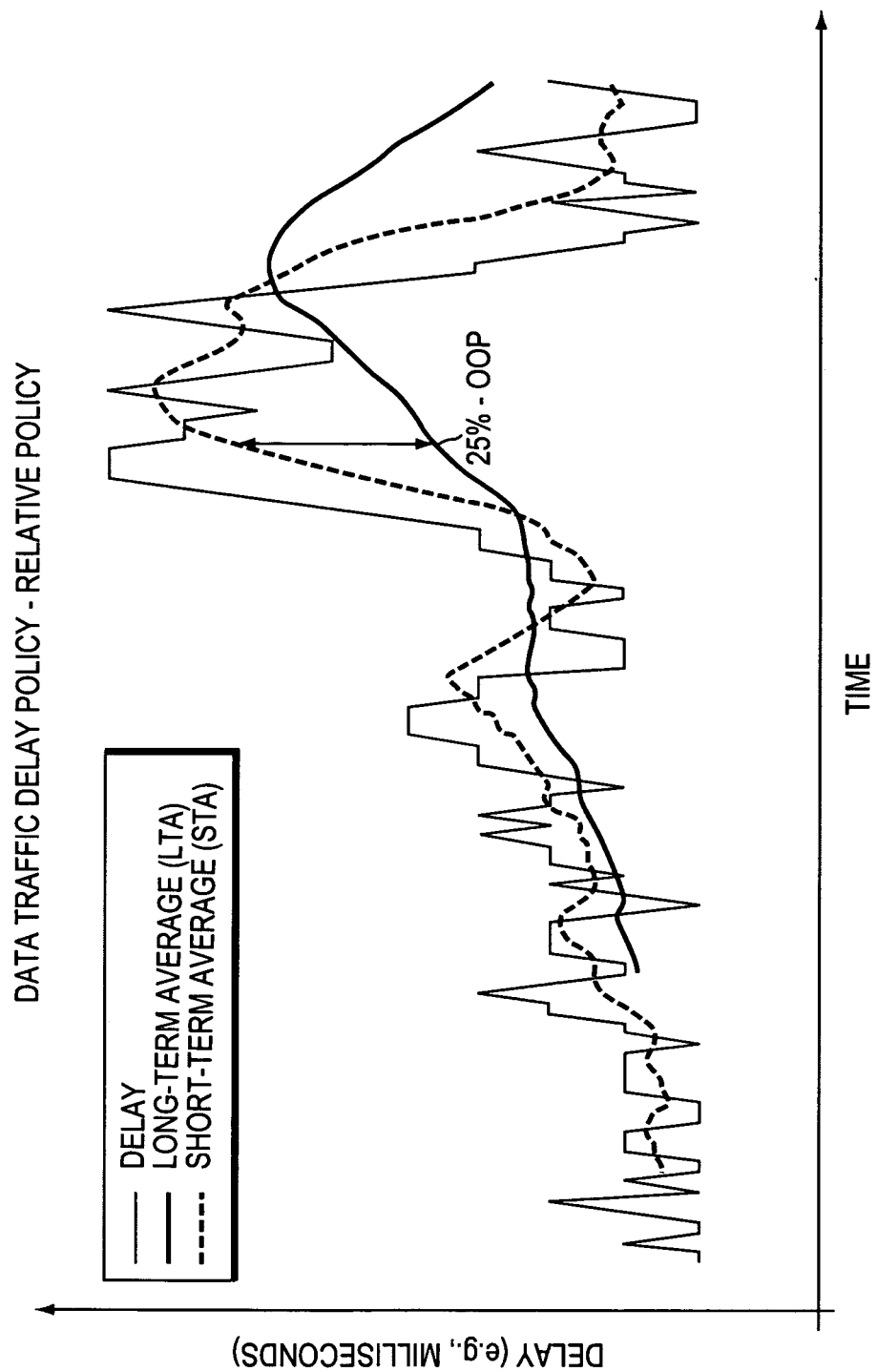
FIG. 4 is an exemplary graph illustrating a relative policy in accordance with the present invention.

As a brief example, FIG. 4 is an exemplary graph illustrating a relative policy in accordance with the present invention. Assume, for instance, that the node (e.g., the Master OER node in FIG. 1) is configured to apply a relative delay policy to data traffic as seen in FIG. 3B. The values for delay (e.g., milliseconds), as shown by the thin solid line, may be determined by using various monitoring techniques, including OER techniques as described above. Also, the values for the LTA and STA, as shown by the thick solid line and thick dashed line, respectively, may be calculated using known averaging techniques, including, but not limited to, known moving average techniques. Over the course of time, the delay may oscillate, such as due to various conditions of the network and traffic. However, once the delay value increases substantially in a short period of time, generally indicative of a problem or other cause for concern, the STA value may be higher than (i.e., for delay, a quality worse than) the LTA value by a configurable amount, which according to this example is 25%. In that event, the prefix is considered OOP (for delay), and the node may search for a more optimal path. Those skilled in the art will understand by observing the initial values shown in FIG. 4 that a slow increase in delay (decrease in quality) may not result in a relative OOP event due to the fact that the STA may never be greater than the LTA by 25% during the increase. Accordingly, a threshold value (not shown) may be configured to create an upper OOP limit for the delay (e.g., 90 seconds), as described above.

Figure 5:
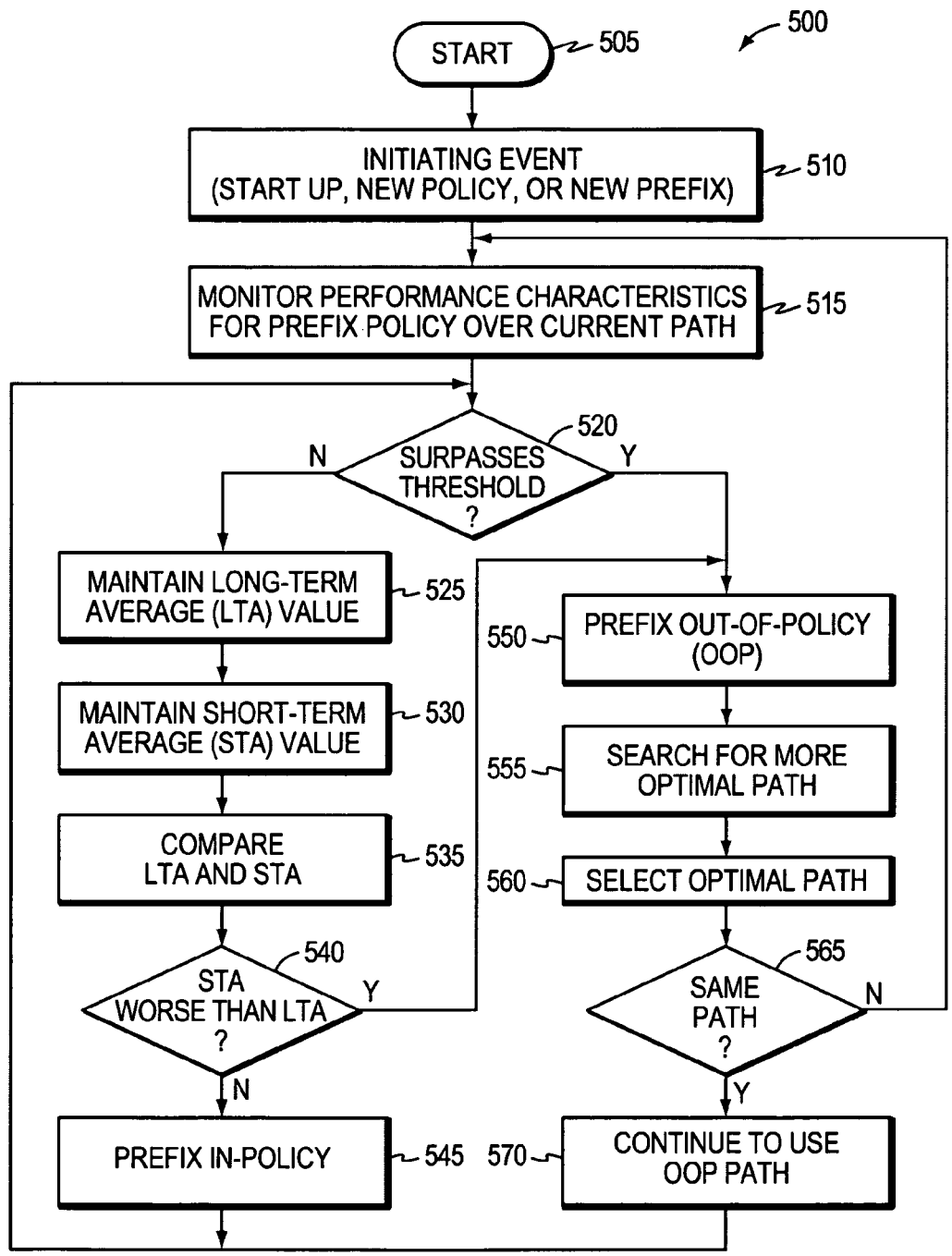
FIG. 5 is a flowchart illustrating a procedure for dynamically maintaining and enforcing relative policies for a prefix in accordance with the present invention.

FIG. 5 is a flowchart illustrating a procedure for dynamically maintaining and enforcing relative policies for a prefix in accordance with the present invention. The procedure 500 starts at step 505, and continues to step 510, where an initiating event occurs, such as starting up the node, creating a new policy, or learning of a new prefix. Once an initiating event occurs, the node monitors the performance characteristics for one or more prefix policies over the current path to the prefix in step 515, as described herein. In step 520 the node determines whether the performance characteristic surpasses a configured threshold. If not, the node begins to maintain an LTA in step 525 and an STA in step 530 in accordance with the methods described in detail above. The STA and LTA are compared in step 535, and if the STA is not worse than the LTA in step 540 (i.e., not a configurable amount higher or lower, as described above), the prefix is considered in-policy, and the procedure returns to step 520 where the node checks the performance characteristic against the threshold, and continues to maintain the LTA and STA accordingly.

If at step 520 the performance characteristic surpasses the threshold, or if at step 540 the STA is worse than the LTA by a configurable amount, the prefix is considered OOP in step 550. In step 555, the node searches for a more optimal path, e.g., in accordance with OER techniques as described herein, and selects the optimal path in step 560. Notably, the OOP current path may remain as the most optimal path, in which case the path remains the same. At step 565, if the optimal path is the current path, the node continues to use the OOP path in step 570, and the procedure returns to step 520 where the node checks the performance characteristic against the threshold, and continues to maintain the LTA and STA for the OOP path accordingly, such as for reasons described above. If, however, at step 565 the optimal path is not the current path (i.e., it is a new path), the procedure returns to step 515 where the node begins monitoring the performance characteristics for one or more prefix policies over the new optimal path.

Advantageously, the novel technique dynamically maintains and enforces relative policies for a prefix in a computer network. By comparing the long-term and short-term average of performance characteristics, the novel technique produces an efficient relative policy for otherwise vague and non-distinct performance characteristic requirements. Also, the use of the threshold detects slow or sudden changes in the performance characteristic that may go unnoticed by comparing averages. Further, the dynamic nature of the novel technique allows for a simple operation of policy creation, alleviating the need for cumbersome manual configuration.

While there has been shown and described an illustrative embodiment that dynamically maintains and enforces relative policies for a prefix in a computer network, it is to be understood that various other adaptations and modifications may be made within the spirit and scope of the present invention. For example, the invention has been shown and described herein for monitoring and selecting paths from a source to a destination. However, the invention in its broader sense is not so limited, and may, in fact, be used to monitor and select any kind of policy-based option, such as a plurality of data/file servers (e.g., based on workload, response time, etc.), computers, applications, processes, etc., as will be understood by those skilled in the art.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for dynamically maintaining and enforcing relative policies for a prefix in a computer network, the method comprising:
    monitoring, by a node of the computer network, a performance characteristic for a prefix over a current path, the prefix associated with a policy;
    maintaining a long-term average (LTA) value of the performance characteristic;
    maintaining a short-term average (STA) value of the performance characteristic;
    comparing the LTA value to the STA value to determine if the STA value indicates a worse value than the LTA value by at least a configurable amount;
    in the event the STA value indicates a worse value than the LTA value by at least the configurable amount, considering, by the node, the prefix to be out-of-policy (OOP) for the policy, wherein a prefix is a portion common to a plurality of addresses that is used by a routing protocol to render routing decisions;
    in the event the prefix is considered to be OOP, determining whether a more optimal path exists than the current path; and
    selecting the more optimal path as a new current path.

2. The method as in claim 1, wherein the more optimal path comprises a path which, when used by the prefix, is estimated to result in the prefix being in-policy.

3. The method as in claim 1, further comprising:
    in the event the STA value indicates a value not worse than the LTA value by at least the configurable amount, considering, by the node, the prefix in-policy for the prefix policy.

4. The method as in claim 3, further comprising:
    in the event the prefix is in-policy, continuing to use the current path.

5. The method as in claim 1, further comprising:
    configuring a threshold value, such that in the event the STA value surpasses the threshold value, the prefix is considered OOP by the node.

6. The method as in claim 1, further comprising:
    configuring a threshold value, such that in the event the performance characteristic surpasses the threshold value, the prefix is considered OOP by the node.

7. The method as in claim 1, wherein the configurable amount is configured from the group consisting of: a percentage, and a fixed amount.

8. The method as in claim 1, wherein the STA value and LTA value are maintained as a rolling average.

9. The method as in claim 1, wherein the method is performed by an optimized edge router (OER).

10. A node for dynamically maintaining and enforcing relative policies for a prefix in a computer network, the node comprising:
    one or more network interfaces;
    a processor coupled to the one or more network interfaces and adapted to execute software processes; and
    a memory adapted to store an optimized edge routing (OER) process executable by the processor, the OER process configured to:
        i) monitor a performance characteristic for a prefix over a current path, the prefix associated with a policy,
        ii) maintain a long-term average (LTA) value of the performance characteristic,
        iii) maintain a short-term average (STA) value of the performance characteristic,
        iv) compare the LTA value to the STA value to determine if the STA value indicates a worse value than the LTA value by at least a configurable amount, and
        v) in the event the STA value indicates a worse value than the LTA value by at least the configurable amount, consider the prefix to be out-of-policy (OOP) for the policy, wherein a prefix is a portion common to a plurality of addresses that is used by a routing protocol to render routing decisions;
        vi) in the event the prefix is considered OOP, determine whether a more optimal path exists than the current path; and
        vii) select the more optimal path as a new current path.

11. The node as in claim 10, wherein the more optimal path comprises a path which, when used by the prefix, is estimated to result in the prefix being in-policy.

12. The node as in claim 10, wherein the OER process is further configured to:
in the event the STA value indicates a value not worse than the LTA value by at least the configurable amount, consider the prefix in-policy for the prefix policy.

13. The node as in claim 12, wherein the OER process is further configured to:
in the event the prefix is in-policy, continue to use the current path.

14. The node as in claim 10, further comprising:
a threshold value stored in the memory, such that in the event the STA value surpasses the threshold value, the OER process is configured to consider the prefix OOP.

15. The node as in claim 10, further comprising:
a threshold value stored in the memory, such that in the event the performance characteristic surpasses the threshold value, the OER process is configured to consider the prefix OOP.

16. The node as in claim 10, wherein the configurable amount is configured from the group consisting of: a percentage, and a fixed amount.

17. The node as in claim 10, wherein the STA value and LTA value are maintained as a rolling average.

18. The node as in claim 10, further comprising: a table configured to store one or more prefix policies.

19. An apparatus for dynamically maintaining and enforcing relative policies for a prefix in a computer network, the apparatus comprising:
a processor; and
a computer-readable storage device having stored therein instructions which, when executed by the processor, cause the processor to perform operations comprising:
monitoring a performance characteristic for a prefix over a current path, the prefix associated with a policy;
maintaining a long-term average (LTA) value of the performance characteristic;
maintaining a short-term average (STA) value of the performance characteristic;
comparing the LTA value to the STA value to determine if the STA value indicates a worse value than the LTA value by at least a configurable amount;
considering the prefix to be out-of-policy (OOP) for the policy in the event the STA value indicates a worse value than the LTA value by at least the configurable amount, wherein a prefix is a portion common to a plurality of addresses that is used by a routing protocol to render routing decisions;
in the event the prefix is considered to be OOP, determining whether a more optimal path exists than the current path; and
selecting the more optimal path as a new current path.

20. The apparatus as in claim 19, the operations further comprising: configuring a threshold value, such that in the event the STA value surpasses the threshold value, the prefix is considered OOP by the node.

21. The apparatus as in claim 19, the operations further comprising: configuring a threshold value, such that in the event the performance characteristic surpasses the threshold value, the prefix is considered OOP by the node.

22. A non-transitory computer-readable storage medium having stored therein instructions which, when executed by a processor, cause the processor to perform operations comprising:
monitoring a performance characteristic, at a node of a computer network, for a prefix over a current path, the prefix associated with a policy;
maintaining a long-term average (LTA) value of the performance characteristic;
maintaining a short-term average (STA) value of the performance characteristic;
comparing the LTA value to the STA value to determine if the STA value indicates a worse value than the LTA value by at least a configurable amount;
in the event the STA value indicates a worse value than the LTA value by at least the configurable amount, considering at the node the prefix to be out-of-policy (OOP) for the policy, wherein a prefix is a portion common to a plurality of addresses that is used by a routing protocol to render routing decisions;
in the event the prefix is considered to be OOP, determining whether a more optimal path exists than the current path; and
selecting the more optimal path as a new current path.

23. The non-transitory computer-readable storage medium as in claim 22, the operations further comprising: configuring a threshold value, such that in the event the STA value surpasses the threshold value, the prefix is considered OOP at the node.

24. The non-transitory computer-readable storage medium as in claim 22, the operations further comprising: configuring a threshold value, such that in the event the performance characteristic surpasses the threshold value, the prefix is considered OOP at the node.

25. A method, comprising:
monitoring, by a node of a computer network, a performance characteristic for a prefix over a current path, the prefix associated with a policy;
maintaining a long-term average (LTA) value of the performance characteristic;
maintaining a short-term average (STA) value of the performance characteristic;
comparing the LTA value to the STA value, to determine if the STA value indicates a worse value than the LTA value by at least a configurable amount;
in response to the comparing indicating that the STA value indicates the worse value than the LTA value by at least the configurable amount, considering, by the node, the prefix to be out-of-policy (OOP) for the policy;
in response to the prefix being considered to be OOP, identifying a new path exists having a better performance characteristic than the current path used with the prefix; and
selecting the new path as a new current path, wherein the prefix comprises a portion common to a plurality of addresses that is used by a routing protocol to render routing decisions.

26. The method as in claim 25, further comprising:
when the STA value does not indicate the worse value than LTA value by at least the configurable amount, considering, by the node, the prefix to be in-policy for the policy; and
in response to the prefix being considered to be in-policy, continuing to use the current path.

27. The method as in claim 25, further comprising:
configuring a threshold value, wherein, in the event the STA value of the performance characteristic for the prefix surpasses the threshold value, the prefix is considered to be OOP by the node.

28. The method as in claim 25, further comprising:
configuring a threshold value, wherein, in the event the performance characteristic for the the prefix surpasses the threshold value, the prefix is considered to be OOP by the node.

29. The method as in claim 25, wherein the configurable amount is selected from the group consisting of: a percentage, and a fixed amount.

* * * * *